US006946526B2

(12) United States Patent
Guerin et al.

(10) Patent No.: US 6,946,526 B2
(45) Date of Patent: Sep. 20, 2005

(54) NITRILE POLYMER VULCANIZATE AND PROCESS FOR THE PRODUCTION THEREOF

(75) Inventors: Frederic Guerin, Petrolia (CA); Judy Hannay, Petrolia (CA); Ezio Campomizzi, Sarnia (CA); Harald Bender, Pulheim (DE)

(73) Assignee: Bayer Inc., Sarnia (CA)

( * ) Notice: Subject to any disclaimer, the term of this patent is extended or adjusted under 35 U.S.C. 154(b) by 225 days.

(21) Appl. No.: 10/352,659

(22) Filed: Jan. 28, 2003

(65) Prior Publication Data

US 2003/0176587 A1 Sep. 18, 2003

(30) Foreign Application Priority Data

Jan. 31, 2002 (CA) ............................................ 2369900

(51) Int. Cl.[7] ............................ C08J 2/24; C08K 3/10; C08K 5/18; C08K 5/5437; C08K 5/3492

(52) U.S. Cl. ...................... 525/329.1; 524/87; 524/100; 524/258; 524/401; 524/436; 525/329.2; 525/329.3; 525/387

(58) Field of Search .......................... 524/87, 100, 258, 524/401, 436, 236; 525/329.1, 329.2, 329.3, 387

(56) References Cited

U.S. PATENT DOCUMENTS 3,886,115 A * 5/1975 Murayama et al. ......... 524/204

FOREIGN PATENT DOCUMENTS

| | | | | |
|---|---|---|---|---|
| EP | 940429 A1 * | 9/1999 | ............ | C08K/3/00 |
| GB | 1 558 491 | 1/1980 | | |

* cited by examiner

*Primary Examiner*—Kelechi C. Egwim
(74) *Attorney, Agent, or Firm*—Diderico van Eyl; Jennifer R. Seng; Jill Denesvich

(57) ABSTRACT

The present invention is directed to a nitrile polymer vulcanizate having improved hot air aging characteristics. The nitrile polymer vulcanizate may be produced by admixing a composition containing: (i) a nitrile polymer; (ii) a filler; (iii) a metal salt of a secondary amine; (iv) a vulcanization system; and optionally (v) an additive selected from the group consisting of a strong base, a salt of a strong base and a weak acid, a salt of a weak acid, a carbodiimide, a polycarbodiimide and mixtures thereof.

15 Claims, No Drawings

NITRILE POLYMER VULCANIZATE AND PROCESS FOR THE PRODUCTION THEREOF

FIELD OF THE INVENTION

The present invention relates to an improved nitrile polymer vulcanizate and to a process for the production thereof. The present invention also relates to nitrile polymer vulcanizates having improved hot air aging characteristics. Additionally, the present invention relates to a vulcanizable composition useful to produce such vulcanizates. Further, the present invention relates to a method for improving the hot air aging characteristics of a nitrile polymer vulcanize.

BACKGROUND OF THE INVENTION

The effects of oxidizing conditions on vulcanizates obtained from polymers having carbon-carbon double bond unsaturation have long been a problem, particularly in applications where the vulcanizates are exposed to elevated temperatures for extended periods of time. A variety of approaches have been developed in the art in an attempt to solve this problem.

It is known that the carbon-carbon double bonds of such polymers activate the vulcanizate to oxidative attack. One solution to the problem of oxidative attack is to use polymers with few or no carbon-carbon double bonds. Examples of such polymers include butyl rubber (a copolymer of isobutylene and isoprene) which typically contain from 0.5 to 3.0 mole percent of carbon-carbon double bond unsaturation, and ethylene-propylene copolymers, which contain no such unsaturation.

Certain applications, such as the various hoses and seals in the engine compartment of automobiles, require vulcanized polymers with a combination of oil resistance and resistance to oxidative attack in air at elevated temperatures for extended periods of time. Vulcanizates of copolymers of conjugated dienes and $\alpha,\beta$-unsaturated nitriles, such as acrylonitrile-butadiene copolymer, commonly known as nitrile rubber or NBR, are well known for their oil resistance. However, they contain carbon-carbon double bond unsaturation and therefore are susceptible to oxidative attack unless subjected to special compounding procedures for the production of oxidation resistant vulcanizates.

In order to reduce the amount of carbon-carbon double bond unsaturation in NBR and yet retain the copolymer's oil resistance, which is thought to be provided by the nitrile functional groups in the copolymer, methods have been developed to selectively hydrogenate the carbon-carbon double bond unsaturation of NBR without hydrogenating the nitrile groups to produce hydrogenated NBR or HNBR. See for example, British patent 1,558,491, the contents of which are hereby incorporated by reference.

While the development of HNBR has been a significant advance in the art, there is still room for improvement. Specifically, there is a continuing need to develop nitrile polymer vulcanizates, which have improved physical properties such as hot air aging, and the like.

SUMMARY OF THE INVENTION

It is an object of the present invention to provide a novel nitrile polymer vulcanizate that has improved physical properties.

It is also an object of the present invention to provide a novel process for producing nitrile polymer vulcanizates.

Additionally, it is an object of the present invention to provide a novel method for improving the hot air aging characteristics of a nitrile polymer vulcanizate Accordingly the present invention provides a nitrile polymer vulcanizate produced by vulcanizing a composition containing:

(i) a nitrile polymer;

(ii) a filler;

(iii) a metal salt of a secondary amine, wherein the metal is selected from groups 1 and 2 of the periodic system of the elements according to IUPAC 1985;

(iv) a vulcanization system; and (v) optionally an additive selected from the group consisting of a strong base, a salt of strong base and a weak acid, a salt of a weak acid, a carbodiimide, a polycarbodiimide and mixtures thereof.

The present invention also provides a process for producing a nitrile polymer vulcanizate including the step of admixing a polymer composition containing:

(i) a nitrile polymer;

(ii) a filler;

(iii) a metal salt of a secondary amine, wherein the metal is selected from groups 1 and 2 of the periodic system of the elements according to IUPAC 1985;

(iv) a vulcanization system; and (v) optionally an additive selected from the group consisting of a strong base, a salt of strong base and a weak acid, a salt of a weak acid, a carbodiimide, a polycarbodiimide and mixtures thereof.

Additionally, the present invention provides a vulcanizable composition containing:

(i) a nitrile polymer;

(ii) a filler;

(iii) a metal salt of a secondary amine, wherein the metal is selected from groups 1 and 2 of the periodic system of the elements according to IUPAC 1985;

(iv) a vulcanization system; and (v) optionally an additive selected from the group consisting of a strong base, a salt of strong base and a weak acid, a salt of a weak acid, a carbodiimide, a polycarbodiimide and mixtures thereof.

Further, the present invention provides a method for improving the hot air aging characteristics of a nitrile polymer including the step of admixing a nitrile polymer with a metal salt of a secondary amine, wherein the metal is selected from groups 1 and 2 of the periodic system of the elements according to IUPAC 1985, and optionally an additive selected from the group consisting of a strong base, a salt of a strong base and a weak acid, a salt of a weak acid, a carbodiimide, a polycarbodiimide and mixtures thereof.

DETAILED DESCRIPTION OF THE INVENTION

It has been discovered that incorporation of a particular additive in a nitrile polymer vulcanizate results in a surprising and unexpected improvement in the hot air aging characteristics of the vulcanizate (i.e., an improvement in the resistance to oxidative attack in air at elevated temperature aging under oxidizing conditions). The improvement in the hot air aging characteristics of the vulcanizate can manifest itself in a number of ways, including (by way of example only) an increase in: (i) the period of time needed for the vulcanizate to reach 100% elongation at break at 150° C.;

and (ii) the maximum service temperature to which the vulcanizate can be exposed for a specified period of time before reaching 100% elongation at break, when compared to a vulcanizate made without the additive. The vulcanizates according to the present invention may also have an improvement (i.e., in comparison to a vulcanizate produced without the additive) in one or more of the following properties: aged hot fluid aging, aged compression set, aged dynamic elastic modulus (E'), aged dynamic viscous modulus (E"), aged static modulus, aged low temperature properties and aged hardness.

Thus, various aspects of the present invention relate to a composition containing:

(i) a nitrile polymer;

(ii) a filler;

(iii) a metal salt of a secondary amine, wherein the metal is selected from groups 1 and 2 of the periodic system of the elements according to IUPAC 1985;

(iv) a vulcanization system; and (v) optionally an additive selected from the group consisting of a strong base, a salt of strong base and a weak acid, a salt of a weak acid, a carbodiimide, a polycarbodiimide and mixtures thereof.

Components (i), (ii), (iii), (iv) and optionally (v) may be added independently of one another or in one or more sub-combinations thereof.

As used throughout the specification, the term "nitrile polymer" is intended to have a broad meaning and is meant to encompass a copolymer containing repeating units derived from at least one conjugated diene and at least one unsaturated nitrile and optionally further repeating units derived from one or more copolymerizable monomers.

The conjugated diene is preferably a $C_4$–$C_{20}$ conjugated diene. Non-limiting examples of suitable such conjugated dienes include butadiene, isoprene, piperylene, 2,3-dimethyl butadiene and mixtures thereof. The preferred $C_4$–$C_6$ conjugated diene is butadiene, isoprene and mixtures thereof. The more preferred $C_4$–$C_6$ conjugated diene is butadiene.

The unsaturated nitrile is preferably a $C_3$–$C_{20}$ $\alpha,\beta$-unsaturated nitrile. Non-limiting examples of suitable such $C_3$–$C_{20}$ $\alpha,\beta$-unsaturated nitriles include acrylonitrile, methacrylonitrile, ethacrylonitrile and mixtures thereof. It is preferred to use a $C_3$–$C_5$ $\alpha,\beta$-unsaturated nitrile, and preferably acrylonitrile.

Preferably, the copolymer contains in the range of from 30 to 90 weight percent of the copolymer of bound conjugated diene and in the range of from 10 to 70 weight percent of the copolymer of bound unsaturated nitrile. More preferably, the copolymer contains in the range of from 60 to 75 weight percent of the copolymer of bound conjugated diene and in the range of from 25 to 40 weight percent of the copolymer of bound unsaturated nitrile. Most preferably, the copolymer contains in the range of from 60 to 70 weight percent of the copolymer of bound conjugated diene and in the range of from 30 to 40 weight percent of the copolymer of bound unsaturated nitrile.

Optionally, the copolymer may further contain repeating units derived from one or more copolymerizable monomers such as a unsaturated carboxylic acid. Non-limiting examples of suitable unsaturated carboxylic acids include fumaric acid, maleic acid, acrylic acid, methacrylic acid and mixtures thereof. The unsaturated carboxylic acid may be present in an amount of from 0.5 to 15 weight percent of the copolymer, with this amount displacing a corresponding amount of the conjugated diolefin. Preferably, the carboxylic acid is an unsaturated mono- or di-carboxylic acid or derivative thereof (e.g., esters, amides and the like).

The present invention may be used with fully or partially unsaturated nitrile polymers, a preferred group of nitrile polymers useful in the production of the present vulcanizate are hydrogenated or partially hydrogenated nitrile polymers (HNBR). Preferably, the copolymer is hydrogenated and contains a residual carbon-carbon double bond unsaturation of less than 30, more preferably in the range of from 30 to 0.05 mole percent, even more preferably in the range of from 15 to 0.05 mole percent, even more preferably in the range of from 10 to 0.05 mole percent, even more preferably in the range of from 7 to 0.05 mole percent, most preferably in the range of from 5.5 to 0.05 mole percent.

The vulcanizable polymer composition further contains a metal salt of a secondary amine, wherein the metal is selected from groups 1 and 2 of the periodic system of the elements according to IUPAC 1985. Examples of suitable metals include lithium, sodium, potassium and calcium. Preferred are sodium and potassium. As one skilled in the art is well aware, combinations of two or more different metals are also suitable. Furthermore mixtures of two or more metal secondary amine salts may be used to tailor the properties of the resulting vulcanizate. The secondary amine may be linear or branched and may have substituents. Examples of suitable substituents include $C_1$–$C_{40}$-alkyl groups, $C_1$–$C_{40}$-aryl groups, $C_1$–$C_{40}$-alkylaryl groups, and $C_1$–$C_{40}$-arylalkyl groups. The substituents may contain atoms other than carbon and hydrogen atoms, such as oxygen, sulfur, phosphorous, nitrogen, halogen, or silicon. Examples thereof include alkoxy, aryloxy, alkylthio, arylthio, alkylamines, arylamines, haloalkyl, haloaryl, and many more which will be obvious to one skilled in the art.

Non-limiting examples of preferred secondary amines include 4,4'-bis-$\alpha,\alpha$-dimethylbenzyl-diphenylamine (sold as Naugard® 445 by Uniroyal), Octylated diphenyl amine (ODPA) (sold as Agerite Stalite® S by R.T. Vanderbilt) or styrenated diphenyl amine (sold as Windstay 29 by Goodyear) or 2,4-bis-(n-octylthio)-6,4(4-hydroxy-3,5-di-t-butylanilino)-1,3,5-triazine (sold as Irganox® 565 by Ciba-Geigy) or butylated/octylated diphenylamine (sold as Irganox® 5057 by Ciba-Geigy).

The secondary amine may also be cyclic. Cyclic structures can be $C_3$–$C_{40}$ cycles and contain substituents, heteroatoms and/or aryl groups etc., such as 2,2,4-trimethyl-1,2-dihydroquinoline polymer (TMQ) (sold as Vulkanox® HS by Bayer).

The salts useful in this invention can be prepared according to standard procedures known in the art. Such as, by treating a THF solution of the diphenylamine compound with one equivalent of a metal hydride wherein the metal is selected from groups 1 and 2 of the periodic system of elements according to IUPAC 1985. Those skilled in the art will be aware of other methods.

Most of the metal secondary amines are air and/or moisture sensitive and will require handling under inert gas, such as nitrogen, argon and the like.

The vulcanizable polymer composition according to the present invention may further contain a filler. The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes), fabrics like woven synthetic or natural fibers, glass compounds like whiskers, and the like. The amount of filler is conventional. Preferably, the filler is present in an amount in the range of from 20 to 130 parts by weight per hundred parts by weight of the nitrile polymer (phr). More preferably, the filler is present in an amount in the range of from 20 to 100 parts by weight per hundred parts by weight of the nitrile polymer. Most preferably, the filler is present in an amount in the range of from 40 to 80 parts by weight per hundred parts by weight of the nitrile polymer.

The vulcanizable polymer composition optionally further contain an additive selected from the group consisting of a strong base, a salt of strong base and a weak acid, a salt of a weak acid, a polycarbodiimide, a carbodiimide and mixtures thereof. Non-limiting examples of strong bases useful in the present vulcanizate are inorganic bases such as sodium hydroxide, potassium hydroxide, calcium oxide and the like. Preferably, the salt has a $pk_a$ of at least 9, more preferably at least 10, more preferably in the range of from 10 to about 14. A preferred group of additives contains a Group 1 metal (e.g., sodium, potassium, etc.) salt of a weak acid (e.g., carbonic acid, phosphonic acid, boric acid, $C_1$–$C_{30}$ fatty acids and the like.) Non-limiting examples of salts useful in the present invention are sodium carbonate, sodium acetate, sodium phosphate, potassium carbonate, sodium stearate, sodium EDTA and mixtures thereof. A preferred salt is sodium carbonate. As there are often synergistic effects between the metal salt of the diphenylamine and the additive, the presence of the additive is preferred. As it will be obvious to the skilled in the art a mixture of several additives of this kind might be used to tailor the properties of the resulting vulcanizate.

If the additive is present, usually an amount in the range of from 0.5 to 30 parts by weight per hundred parts by weight of nitrile polymer is used, more preferably in the range of from 1 to 10 parts by weight per hundred parts by weight of nitrile polymer, most preferably in the range of from 2 to 8 parts by weight per hundred parts by weight of nitrile polymer.

The vulcanization system used in producing the nitrile polymer vulcanizate in accordance with the present invention is conventional and the choice thereof is within the purview of a person skilled in the art.

In one embodiment, the vulcanization system used in the present invention contains an organic peroxide (e.g., dicumyl peroxide, 2,2'-bis(tert-butylperoxy diisopropylbenzene and the like).

In another embodiment, the vulcanization system used in the present invention contains sulfur or a conventional sulfur-containing vulcanization product such as Vulkacit® DM/C (benzothiazyl disulfide), Vulkacit® Thiuram MS/C (tetramethyl thiuram monosulfide), Vulkacit® Thiuram/C (tetramethyl thiuram disulfide), mixtures thereof and the like. Preferably, such sulfur-based vulcanization systems further contain a peroxide such as zinc peroxide.

In the process according to the present invention, the nitrile polymer, the filler, the vulcanization system and the optional additive may be admixed in any conventional manner known to the art. For example, this polymer composition may be admixed on a two-roll rubber mill or an internal mixer.

Thus, the polymer composition is mixed in a conventional manner and the temperature thereof during mixing is maintained as is known in the art.

However, as most of the secondary amine metal salts are air and/or moisture sensitive, handling and/or processing of the materials under inert conditions is preferred.

In the process of the present invention, it is furthermore preferred to heat the polymer composition to form vulcanizates using conventional procedures well known in the art. Preferably, the polymer composition is heated to a temperature in the range of from 130° to 200° C., preferably from 140° to 190° C., more preferably from 150° to 180° C.

Preferably, the heating is conducted for a period in the range of from 1 minutes to 15 hours, more preferably in the range of from 5 minutes to 30 minutes.

Other conventional compounding ingredients may also be included by mixing with the copolymer in the conventional manner. Such other compounding ingredients are used for their conventional purposes and include activators such as zinc oxide and magnesium oxide; anti-oxidants; stearic acid; plasticizers; processing aids; reinforcing agents; fillers; promoters and retarders in amounts well known in the art.

Embodiments of the present invention will be illustrated with reference to the following Examples, which are provided for illustrative purposes and should not be used to limit the scope of the invention.

EXAMPLES

Materials Used in the Examples

Partially hydrogenated nitrile rubber (Therban® C3467), with an acrylonitrile (ACN) content of 34% and a residual unsaturation level (RDB) of 5.5% was supplied by Bayer Corp., USA. Residual emulsifier and anti-degradants were removed from the polymer by successive MeOH coagulation of the polymer from a 6% monochlorobenzene solution. Sodium hydride (NaH) and tetrahydrofuran (THF) were purchased from Aldrich and used as received. Other compounding ingredients are those typically used in the industry and were used as received.

Preparation of Salts

Na Naugard® 445 (4,4'-bis-α,α-dimethylbenzyl-diphenylamido sodium) of Uniroyal, Na Vulkanox®BKF and $Na_2$ Vulkanox®BKF {2,2'-methylene-bis-(4-methyl-6-tert-butylphenolate) mono and disodium} and Na Vulkanox®BHT {(2,6-di-tert-butyl-4-methylphenolate) monosodium} all of Bayer AG were prepared in identical manner and the preparation of $Na_2$ Vulkanox®BKF is described below. This synthetic method to prepare sodium salts of amines by the deprotonation of the secondary amine using NaH is well know and has been documented extensively in the literature. The nature of the salts was confirmed by $^1$H-NMR spectroscopy and by their reactivity. The salts are air and moisture sensitive and were handled under an inert atmosphere to prevent their decomposition.

Preparation of $Na_2$ Vulkanox®BKF

A THF solution (50 ml) of Vulkanox®BKF® (10.00 g, 29.3 mmol) was degassed with dry nitrogen for 20 minutes. 2 equivalents of solid NaH (1.397 g, 58.2 mmol) were slowly added to this solution. The release of hydrogen was observed immediately after the addition of the NaH and continued for 15–20 minutes. The reaction mixture was stirred at room temperature for 3 hours. The solvent was removed under vacuum yielding a beige air sensitive solid (11.10 g; 28.9 mmol; 99%). $^1$H NMR 6.76 (broad, 2H, Ar), 6.65 (broad, 2H, Ar), 3.54 (s, 2H, $CH_2$), 2.06 (s, 6H, Me), 1.35 (s, 18H, t-Bu).

Polymer Film Preparation

The additives were added to the polymers on an open mill at 40° C. Thin polymer films (0.2 mm thickness) were pressed cured between sheets of Teflon® film at 275.8 Mpa pressure for 15 minutes at 150° C.

Aging Environment

The accelerated aging was conducted in a recirculating hot air oven at 140° C. The films were aged on Teflon® sheet to prevent contamination but no particular effort was made to exclude UV light exposure. The compound aging was carried out according to ASTM E145.

IR Spectroscopy

IR studies were carried out for unaged and aged polymer films by pressing pieces of the films to a consistent thickness between the plates of a 4-mm diamond cell. All testing was carried out using a Bruker IFS 66 FT-IR instrument.

Examples 1–12

Film Preparation

Films were prepared by mixing the ingredients on an open-mill using standard mixing procedure. Thin films (0.2 mm) were pressed-cured at 150° C. for 15 minutes. The various comparative formulations prepared with phenolic salts are shown in Table 1 and those using inventive secondary amine salts are presented in Table 2. Residual emulsifier and additives from the manufacturing process were removed from the base polymer by successive coagulation from monochlorobenzene/MeOH. The accelerated aging was performed in an air oven at 140° C.

TABLE 1

Comparative Formulations Used for Film Preparation (Phenolic salts)

| Example | 1 | 2 | 3 | 4 | 5 | 6 | 7 | 8 | 9 |
|---|---|---|---|---|---|---|---|---|---|
| Therban ® C3467 | 100 | 100 | 100 | 100 | 100 | 100 | 100 | 100 | 100 |
| $Na_2CO_3$* | | | 2 | | | 2 | | | |
| NaStearate | | | | 0.5 | | | | | |
| Vulkanox ® BHT | | | | | 0.3 | | | | |
| Vulkanox ® BKF | | 0.3 | | | | 0.3 | | | |
| Na Vulkanox ® BHT | | | | | | | 0.3 | | |
| $Na_2$ Vulkanox ® BKF | | | | | | | | 0.3 | |
| Na Vulkanox ® BKF | | | | | | | | | 0.3 |
| Dicumyl Peroxide (40%) | 5 | 5 | 5 | 5 | 5 | 5 | 5 | 5 | 5 |

*Dynamar ® RC 5251Q supplied by Dyneon LLC.

TABLE 2

Formulations Used for Film Preparation Prepared with Secondary Amines and with Secondary Amine Salts According To The Present Invention.

| Examples | 10 | 11** | 12** |
|---|---|---|---|
| Therban ® C3467 | 100 | 100 | 100 |
| $Na_2CO_3$* | | | 2 |
| Naugard ® 445 | 1 | | |
| NaNaugard ® 445 | | 1 | 1 |
| Dicumyl Peroxide (40%) | 5 | 5 | 5 |

*Dynamar ™ RC 5251Q

**Formulations according to the present invention

Samples were taken at various intervals and the progress of the thermo-oxidation was monitored by IR spectroscopy. The time required for the intensity of the signal due to the —COO— groups (1700–1600 $cm^{-1}$) to equal the signal due to the nitrile (C≡N) groups was arbitrarily taken as the lifetime of the sample. All films were aged under identical conditions in two different studies with two common films (Control and Vulkanox®BKF) and a lifetime was estimated using this method for all of them. The results are shown in Table 3.

TABLE 3

Summary of Aging Results

| Ingredients | Time (h) | Ingredients | Time (h) |
|---|---|---|---|
| Therban ® C3467 (Control) | 42 | NaStearate | 36 |
| | | Vulkanox ® BKF | 86 |
| $Na_2CO_3$ | 36 | Vulkanox ® BKF + $Na_2CO_3$ | 442 |
| Vulkanox ® BHT | 42 | | |
| Na Vulkanox ® BHT | 66 | $Na_2$ Vulkanox ® BKF | 234 |
| Na Vulkanox ® BKF | 186 | NaNaugard ® | 552 |
| Naugard ® 445 | 336 | NaNaugard ® + $Na_2CO_3$ | 1512 |

Using this approach, a lifetime of 42 hours is estimated for the control film containing only the polymer and the curing agent dicumyl peroxide. As expected, no improvement in heat aging performance is observed by the addition of $Na_2CO_3$ or NaStearate to the polymer matrix. No improvement in aging behavior was observed with the addition of Vulkanox®BHT while the addition of Vulkanox®BKF resulted in a slight increase in the lifetime of the film (86 hours compared to 42 hours for the control). These observations are expected based on the high volatility of Vulkanox®BHT compared to that of Vulkanox®BKF and the reactivity of simple phenolic anti-oxidants towards radical generated during the curing process A synergy between the secondary amine salt and $Na_2CO_3$ is well demonstrated by the drastic improvement in aging performance observed in Example 12.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vulcanizable composition comprising:

(i) a nitrile polymer;

(ii) a filler;

(iii) a metal salt of a secondary amine, wherein the metal is selected from groups 1 and 2 of the periodic system of the elements according to IUPAC 1985, wherein the secondary amine is 4,4'-bis-α,α-dimethylbenzyl-diphenylamine, octylated diphenyl amine, styrenated diphenyl amine, 2,4-bis-(n-octylthio)-6-(4-hydroxy-3,5-di-t-butylanilino)-1,3,5-triazine, butylated/octylated diphenylamine, or 2,2,4-trimethyl-1,2-dihydroquinoline polymer;

(iv) a vulcanization system; and (v) optionally an additive selected from the group consisting of a strong base, a salt of strong base and a weak acid, a salt of a weak acid, a carbodiimide, a polycarbodiimide and mixtures thereof.

2. The vulcanizable composition according to claim 1, wherein the nitrile polymer comprises a copolymer of a conjugated diene and an unsaturated nitrile.

3. The vulcanizable composition according to claim 2, wherein the copolymer further comprises an unsaturated mono- or di-carboxylic acid or derivative thereof.

4. The vulcanizable composition according to claim 2, wherein the copolymer is hydrogenated.

5. The vulcanizable composition defined in claim 4, wherein the copolymer comprises a residual carbon-carbon double bond unsaturation of less than 30 mole percent.

6. The vulcanizable composition according to claim 1, wherein the metal is lithium, sodium, potassium or calcium.

7. The vulcanizable composition according to claim 6, wherein the metal is sodium.

8. The vulcanizable composition according to claim 1, wherein the filler comprises carbon black.

9. The vulcanizable composition according to claim 1, wherein the salt of a strong base and a weak acid has a $pk_a$ in the range of from 10.0 to 12.0.

10. The vulcanizable composition according to claim 9, wherein the salts is sodium carbonate, sodium acetate, sodium phosphate, potassium carbonate, sodium stearate, sodium EDTA and mixtures thereof.

11. The vulcanizable composition according to claim 10, wherein the salts is sodium carbonate.

12. The vulcanizable composition according to claim 1, wherein the vulcanization system comprises a peroxide compound.

13. A process for producing a nitrile polymer vulcanizate comprising the step of admixing a polymer composition comprising:

(i) a nitrile polymer;

(ii) a filler;

(iii) a metal salt of a secondary amine with the metal being selected from groups 1–2 of the periodic system of the elements (IUPAC 1985) wherein the secondary amine is 4,4'-bis-α,α-dimethylbenzyl-diphenylamine, octylated diphenyl amine, styrenated diphenyl amine, 2,4-bis-(n-octylthio)-6-(4-hydroxy-3,5-di-t-butylanilino)-1,3,5-triazine, butylated/octylated diphenylamine, or 2,2,4-trimethyl-1,2-dihydroquinoline polymer;

(iv) a vulcanization system; and (v) optionally an additive selected from the group comprising: a strong base, a salt of strong base and a weak acid, a salt of a weak acid, a carbodiimide, a polycarbodiimide and mixtures thereof.

14. The process according to claim 13, wherein the polymer composition is maintained at a temperature in the range of from 135° to 200° C.

15. A vulcanizable composition comprising:

(i) a nitrile polymer;

(ii) a filler;

(iii) a metal salt of a secondary amine, where the metal is selected from groups 1 and 2 of the periodic system of the elements according to IUPAC 1985, wherein the secondary amine is 4,4'-bis-α,α-dimethylbenzyl-diphenylamine, octylated diphenyl amine, styrenated diphenyl amine, 2,4-bis-(n-octylthio)-6-(4-hydroxy-3,5-di-t-butylanilino)-1,3,5-triazine, butylated/octylated diphenylamine, or 2,2,4-trimethyl-1,2-dihydroquinoline polymer;

(iv) a vulcanization system; and (v) optionally an additive selected from the group consisting of a strong base, a salt of strong base and a weak acid, a salt of a weak acid, a carbodiimide, a polycarbodiimide and mixtures thereof.

* * * * *